J. W. HASSELKUS.
PERISCOPE AND THE LIKE.
APPLICATION FILED MAY 18, 1912.

1,131,514.

Patented Mar. 9, 1915.
2 SHEETS—SHEET 1.

WITNESSES
L. H. Grote
M. E. Keir

INVENTOR
JOHN WILLIAM HASSELKUS
By Howson and Howson
his Attorneys

J. W. HASSELKUS.
PERISCOPE AND THE LIKE.
APPLICATION FILED MAY 18, 1912.

1,131,514.

Patented Mar. 9, 1915.
2 SHEETS—SHEET 2.

WITNESSES

INVENTOR
JOHN WILLIAM HASSELKUS
his Attorneys

UNITED STATES PATENT OFFICE.

JOHN WILLIAM HASSELKUS, OF CLAPHAM COMMON, LONDON, ENGLAND, ASSIGNOR TO ROSS LIMITED, OF CLAPHAM COMMON, LONDON, ENGLAND.

PERISCOPE AND THE LIKE.

1,131,514.      Specification of Letters Patent.      Patented Mar. 9, 1915.

Application filed May 18, 1912. Serial No. 698,235.

*To all whom it may concern:*

Be it known that I, JOHN WILLIAM HASSELKUS, a subject of the King of Great Britain and Ireland, of 3 North Side, Clapham Common, in the county of London, England, have invented new and useful Improvements in Periscopes and the like, of which the following is a specification.

This invention relates to periscopes and the like of the type shown in my Patent 1,047,051, dated Dec. 10, 1912.

The present invention has for its object, aside from an improved lens system, to increase the brilliancy of the image by lessening the amount of glass through which the image-forming rays must pass.

Figure 1:
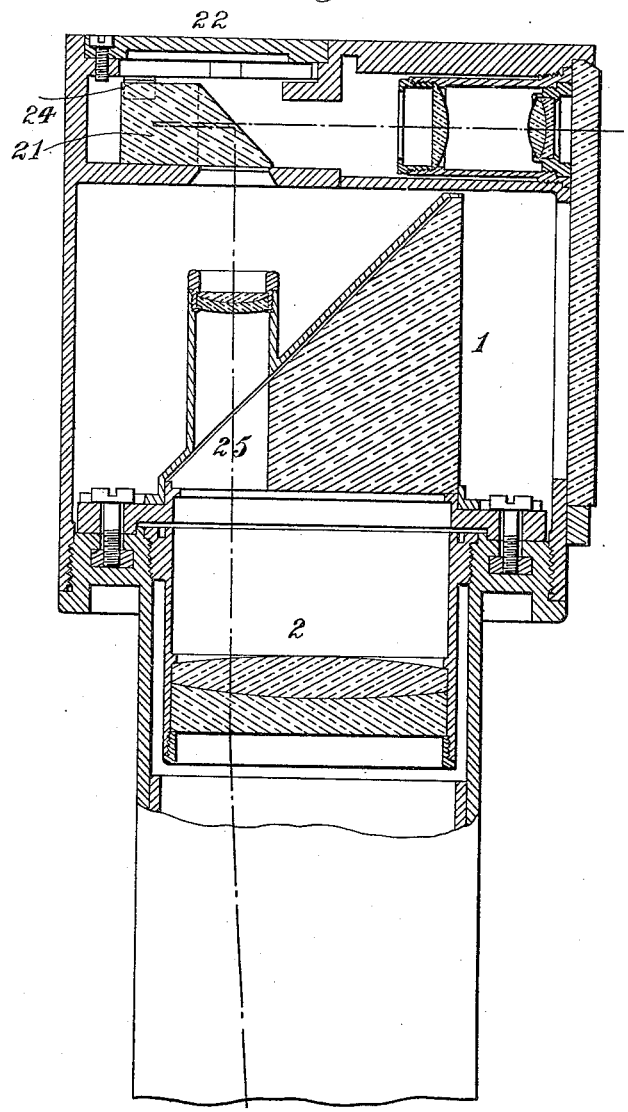
Figure 2:
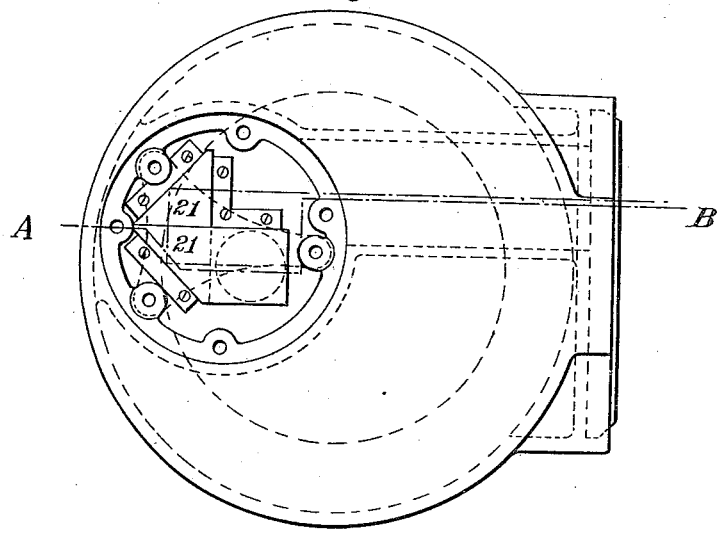
Figure 3:
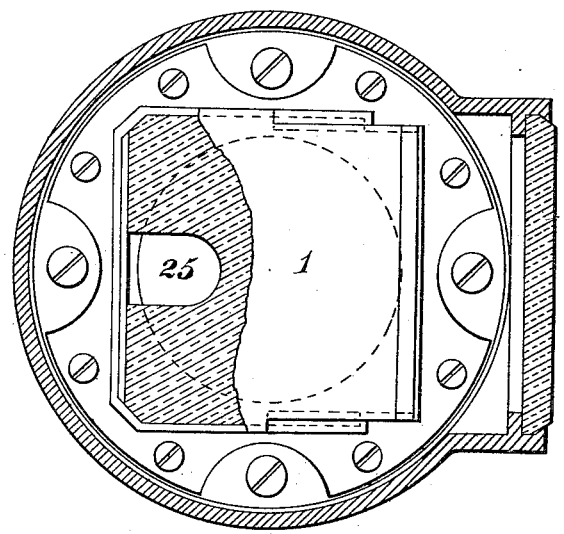

In the accompanying drawings, Figure 1 is a longitudinal section on the line A—B, Fig. 2, of the upper portion of the instrument; Fig. 2 is a plan with the cover 22 of the prism combination of the auxiliary optical system removed; and Fig. 3 is a cross section through the upper main prism.

The prism combination 21 here shown reverses the image from one hand to the other (say right to left) and causes the emerging rays, (indicated by the dotted lines) to leave the said combination at an angle of 90° or thereabout, to their original direction, the necessary reversal of the image in a vertical direction being produced by the lower main prism (not shown, but marked 5 in Patent 1,047,051 above mentioned), of the instrument. The lens combination 21 may be secured in position in any suitable way, as by a spring 24 pressing thereon.

To increase the illumination, whether in an instrument according to the aforesaid U. S. Letters Patent No. 1,047,051, dated Dec. 10, 1912, or in one improved as hereinbefore described, I omit the special prism (marked 14 in the drawings of the specification of the aforesaid U. S. Letters Patent No. 1,047,051, dated Dec. 10, 1912, cemented to the hypotenuse of the upper main prism 1 and to enable the rays from the auxiliary optical system to pass unhindered, or practically unhindered, to the object glass 2 of the main telescope, I omit, or cut away, a portion of the upper prism 1, which may be done for instance by boring a hole of the required diameter through the prism, or (as shown in the accompanying drawing) by cutting a slot 25 from the edge toward the middle of the said prism, until the required aperture is obtained. The outer parts of the instrument are, or may be, like those of the aforesaid U. S. Letters Patent No. 1,047,051, dated Dec. 10, 1912, and require no description or further illustration here.

What I claim is:—

1. In a periscope, a main sighting aperture and a main prism for deflecting the image therefrom, in combination with an auxiliary sighting aperture and an auxiliary deflecting prism for deflecting the image therefrom, said main prism being apertured to permit the unimpeded passage therethrough of the image from the auxiliary deflecting prism system to the main system, substantially as described.

2. In a periscope having a main sighting aperture, a prism for deflecting the image therefrom, an auxiliary sighting aperture and means for deflecting the image from the latter through the main deflecting prism, the latter being apertured to permit the unimpeded passage therethrough of the image from the auxiliary sighting aperture, substantially as described.

In testimony whereof I have signed my name to this specification in the presence of two subscribing witnesses.

JOHN WILLIAM HASSELKUS.

Witnesses:
    J. H. RICHMOND,
    C. M. MCGILCHRIST.

Copies of this patent may be obtained for five cents each, by addressing the "Commissioner of Patents, Washington, D. C."